US006678345B2

United States Patent
Hartmann et al.

(10) Patent No.: US 6,678,345 B2
(45) Date of Patent: Jan. 13, 2004

(54) REACTOR PRESSURE VESSEL AND PROCESS FOR TEMPERATURE EQUALIZATION IN A REACTOR PRESSURE VESSEL

(75) Inventors: Heinz-Werner Hartmann, Buckenhof (DE); Jürgen Model, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 125 days.

(21) Appl. No.: 09/854,656

(22) Filed: May 14, 2001

(65) Prior Publication Data

US 2003/0202627 A1 Oct. 30, 2003

Related U.S. Application Data

(63) Continuation of application No. PCT/EP99/08350, filed on Nov. 2, 1999.

(30) Foreign Application Priority Data

Nov. 13, 1998 (DE) .......................................... 198 52 567

(51) Int. Cl.[7] ........................ G21C 13/00; G21C 13/02; G21C 15/02

(52) U.S. Cl. ........................ 376/294; 396/352; 396/377; 396/389; 396/399; 396/246

(58) Field of Search ................................. 376/294, 352, 376/377, 389, 399, 246

(56) References Cited

U.S. PATENT DOCUMENTS

| 4,164,443 A | 8/1979 | Gibbons et al. | 376/352 |
| 4,557,891 A | 12/1985 | Gibbons et al. | 376/397 |
| 4,786,461 A | 11/1988 | Veronesi et al. | 376/352 |
| 4,788,032 A | 11/1988 | Baujat et al. | 376/352 |

FOREIGN PATENT DOCUMENTS

| DE | 19607693 A1 | 5/1997 | .................. 376/352 |

*Primary Examiner*—Jack Keith
(74) *Attorney, Agent, or Firm*—Laurence A. Greenberg; Werner H. Stemer; Ralph E. Locher

(57) ABSTRACT

A reactor pressure vessel with an upper support plate, in which an equalization opening is provided as a bypass is described. A process for temperature equalization between an upper dome chamber above a support plate and a lower chamber below it is described. It is proposed that the cross section of the equalization opening be variable as a function of the temperature, so that the flow of medium between the upper dome chamber and the lower chamber is varied as a function of the temperature.

10 Claims, 2 Drawing Sheets ary application is a continuation of copending International Application No. PCT/EP99/08350, filed Nov. 2, 1999, which designated the United States.

REACTOR PRESSURE VESSEL AND PROCESS FOR TEMPERATURE EQUALIZATION IN A REACTOR PRESSURE VESSEL

CROSS-REFERENCE TO RELATED APPLICATION

This application is a continuation of copending International Application No. PCT/EP99/08350, filed Nov. 2, 1999, which designated the United States.

BACKGROUND OF THE INVENTION

Field of the Invention

The invention relates to a reactor pressure vessel with an upper support plate, which occupies its cross section above upper connecting branches and divides an upper dome chamber from a lower chamber. The support plate has openings to accommodate control rods and at least one equalization opening (dome bypass).

The invention also relates to a process for temperature equalization between an upper dome chamber above and a lower chamber below a support plate in a reactor pressure vessel of a reactor plant. The support plate occupying the cross section of the reactor pressure vessel above the upper connecting branches, and a medium flowing through an equalization opening in the lattice plate.

In a nuclear power station with a pressurized water reactor an upper support plate, which occupies the cross section of the reactor pressure vessel, is generally disposed in the reactor pressure vessel above the upper connecting branches of the primary circulation. The plate divides the reactor pressure vessel into a larger lower chamber and a smaller upper dome chamber facing the pressure vessel dome and serves to hold control rods in position.

At least two different configuration variants exist. The first variant is used mainly in Germany. It provides for the upper support plate to be configured as a lattice plate. In such a lattice plate the openings for the control rods are each significantly larger than the cross section of a control rod. This therefore leaves a relatively large free cross section surrounding the control rod in each opening. Through this free cross section an exchange of medium (coolant exchange) is possible between the upper dome chamber and the lower chamber in the reactor pressure vessel. An additional opening (dome bypass) nevertheless exists in the edge area of the upper lattice plate. This configuration is referred to as a "hot dome".

The second configuration variant for a reactor pressure vessel, which is used mainly in France and the USA, provides for openings in the support plate to accommodate control rods, in which the cross section of an opening largely corresponds to the control rod cross section. Very little space, if any, therefore remains for an exchange of medium (coolant exchange) between the two chambers adjoining the support plate. This variant is referred to as "cold dome" and requires a relatively large equalization opening (dome bypass) in the edge area of the support plate in order to ensure a sufficient exchange of coolant at all times.

During continuous power output operation of a nuclear power station a small dome bypass with a small cross section is sufficient. The small bypass must merely be capable of ensuring that a homogeneous boron concentration is maintained throughout the reactor pressure vessel. Too large a dome bypass is undesirable in power output operation, since this would result in the coolant circulation in the reactor pressure vessel being led not only through the reactor core but also through the upper dome chamber, which would lead to a reduction of the reactor outlet temperature of the coolant and to an increase in the necessary capacity of the coolant pump in the primary circulation and hence to a power output loss of the power station.

A reactor pressure vessel of the "cold dome" variant largely keeps the hot coolant away from the dome chamber, since the control rods are fitted as tightly as possible into openings provided for them in the support plate. The above-mentioned power output loss occurs, however, if a relatively large dome bypass is provided.

The variant of the reactor pressure vessel referred to as "hot dome" has large openings in the lattice plate, large parts of which remain free even with the control rods are inserted. Because the coolant circulation in the reactor pressure vessel is also always led through the upper dome chamber, in power output operation the temperature of the coolant in the dome chamber is consequently largely identical to the temperature below the support plate.

Another situation results when shutting a nuclear power station down for an inspection or for changing fuel elements. In both variants of the reactor pressure vessel, the coolant present in the reactor pressure vessel must then be cooled from approximately 300° C. to approximately 50° C. The cooling time for the content of the dome chamber and the reactor dome itself is determined by the size of the dome bypass.

In the "cold dome" variant a relatively large dome bypass would be needed in order to obtain a sufficiently short cooling time. As stated, however, such a dome bypass would cause a high power station output loss.

Although a coolant exchange through the lattice plate is in principle possible in the case of the "hot dome" variant, when running the plant down, that is to say when cooling by way of the coolant circulation, the hot coolant of lower relative density above the connecting branches remains in the upper dome chamber, while the temperature in the lower part of the reactor pressure vessel continually falls.

The temperature difference between the lower part of the reactor pressure vessel and its dome that occurs when shutting the nuclear power station down results in different thermal expansions of the two parts. This may lead to the dome bolts being somewhat skewed in their threads so that they cannot be immediately screwed out. An additional cooling time is therefore necessary, so that the reactor dome can also assume the temperature of the rest of the reactor pressure vessel.

SUMMARY OF THE INVENTION

It is accordingly an object of the invention to provide a reactor pressure vessel and a process for temperature equalization in the reactor pressure vessel that overcome the above-mentioned disadvantages of the prior art devices and methods of this general type, in which a minimum possible loss is to be sustained in power output operation, and in which temperature differences between the lower part of the reactor pressure vessel and the upper reactor dome do not occur or are rapidly equalized when running down the nuclear power station.

With the foregoing and other objects in view there is provided, in accordance with the invention, a reactor pressure vessel. The reactor pressure vessel contains a reactor pressure body having a chamber formed therein and a cross-section, and upper connecting branches connected to the reactor pressure body. An upper support plate is disposed in the reactor pressure body above the upper connecting branches and expanding over the cross-section of the reactor pressure body. The upper support plate divides the chamber of the reactor pressure body into an upper dome chamber and a lower chamber. The upper support plate has openings formed therein for accommodating control rods and at least one equalization opening formed therein, the equalization opening has a cross section being variable as an inverse function of a temperature in the lower chamber.

Another object of the invention is to specify a suitable process for temperature equalization between the upper dome chamber and the lower chamber in the reactor pressure vessel, situated above and below the support plate respectively.

According to the invention the first aforementioned object is achieved in that the cross section of the equalization opening (dome bypass) is variable as an inverse function of the temperature in the lower chamber.

This affords the advantage that in power output operation of the nuclear power station with a small cross section of the equalization opening (dome bypass) only a little medium (coolant) passes into the dome chamber, whereas when running or shutting the nuclear power station down with a large cross section of the equalization opening (of the dome bypass) a rapid exchange of medium and hence temperature exchange occurs between the upper dome chamber and the lower chamber of the reactor pressure vessel.

Power losses otherwise attributable to a large dome bypass are advantageously minimized. It is consequently possible to manage with a correspondingly small coolant pump capacity for the primary circulation. Just enough coolant is exchanged between the chambers adjoining the support plate to keep the boron concentration on both sides of the support plate largely equal, which is advisable for routine operation.

The reactor pressure vessel according to the invention affords the advantage when running a nuclear power station down that the reactor dome is cooled with a similar rapidity as the rest of the reactor pressure vessel, owing to the then significantly increased exchange of coolant through the equalization opening (dome bypass). The still hot coolant, which is either trapped above a largely closed support plate or, where a lattice plate is provided, has collected beneath the reactor dome solely due to the buoyancy of the hotter medium in the colder medium, is replaced by cooler medium through the enlarged cross section of the equalization opening (dome bypass). This results therefore in a more uniform cooling of the lower part of the reactor pressure vessel and of the upper reactor dome than hitherto, so that no additional cooling times are required in order to be able to remove the reactor dome.

For example, the equalization opening forms a dome bypass between the lower chamber, which is a reactor annulus defined by the pressure vessel wall and the core installations, and the dome chamber. The connecting branches open into the annulus, known in the art, so that the coolant can advantageously pass into the upper dome chamber by a short route, especially through the dome bypass. From there it flows either along the control rods or through the openings in the lattice plate back into the lower part of the reactor pressure vessel. In the "cold dome" variant the control rods, for example, are surrounded by cladding tubes, in which space remains for a slight through-flow of coolant.

For example, the cross section of the equalization opening (dome bypass) is passively temperature-controlled. This affords the particular advantage that without external intervention the available opening is at all times suited to a prevailing temperature.

For example, a device is fitted in the equalization opening (dome bypass), which device in the event of a temperature drop enlarges the cross section of the equalization opening by utilizing the thermal contraction of the material of the device, and in the event of a temperature rise reduces the cross section of the equalization opening by utilizing the thermal expansion of the material of the device. Such a device is especially suited to passively controlling the equalization opening as a function of the temperature.

The equalization opening (dome bypass) contains an expansion sleeve, for example, which enlarges the flow cross section in the event of a temperature drop. Such an expansion sleeve, is disclosed by Published, Non-Prosecuted German Patent Application DE 196 07 693 A1, and varies the cross section of an opening solely on the basis of the prevailing temperature.

The expansion sleeve is connected, for example, to a hollow piston guided in a cylinder open at an end. The inside of the piston is connected by way of end openings of the piston both to the lower chamber below the support plate and to the dome chamber above it. The piston also has additional lateral openings, which when the expansion sleeve contracts align with openings situated in the side wall of the cylinder, or overlap the openings. The cross section of the equalization opening (dome bypass) is enlarged when the expansion sleeve contracts due to a drop in temperature.

According to the invention the object of specifying a suitable process for temperature equalization is achieved in that the flow of medium is varied as an inverse function of the temperature in the lower chamber.

This affords the advantage that in power output operation of the nuclear power station a reduction in the power output of the power station cannot occur due to a low medium flow (coolant flow) at high temperature. Conversely, when a rapid cooling of the medium (coolant) in the upper dome chamber is required when running the power station down, the desired temperature drop in the upper dome chamber is achieved in a short time owing to a high medium flow (coolant flow) at relatively low temperature.

For example, a bypass flow of the medium through the equalization opening connects the lower chamber, which may be a reactor annulus defined by the pressure vessel wall and the core installations, to the upper dome chamber. In this way a rapid and reliable feeding of the medium (coolant) into the upper dome chamber is possible when necessary. The medium can leave the upper dome chamber along the control rods.

The medium flow (coolant flow) is passively temperature-controlled, for example. No expensive additional devices are then needed to control the flow.

The medium flow is increased, for example, owing to a temperature drop in the reactor pressure vessel when running the reactor plant down. This affords the advantage that just when running down the nuclear power station with a resultant cooling of the lower chamber of the reactor pressure vessel, a rapid temperature equalization is ensured with the upper dome chamber in the reactor pressure vessel.

The reactor pressure vessel and the process according to the invention in particular afford the advantage that the cross section of the equalization opening (dome bypass) in the upper support plate in the reactor pressure vessel forming a bypass and the strength of the medium flow in the bypass at all times correspond to the requirements.

Other features which are considered as characteristic for the invention are set forth in the appended claims.

Although the invention is illustrated and described herein as embodied in a reactor pressure vessel and a process for temperature equalization in a reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
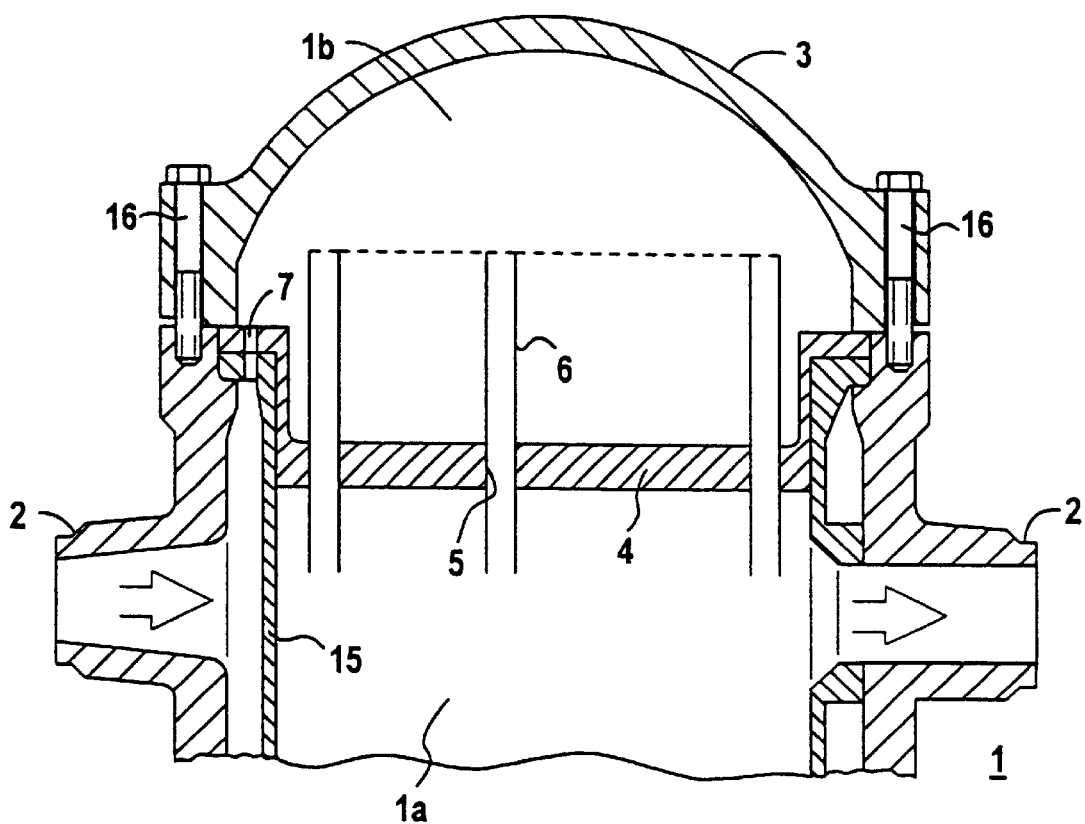
FIG. 1 is a diagrammatic, sectional view of an upper part of a reactor pressure vessel, in which an equalization opening is provided in an upper support plate according to the invention.

In all the figures of the drawing, sub-features and integral parts that correspond to one another bear the same reference symbol in each case. Referring now to the figures of the drawing in detail and first, particularly, to FIG. 1 thereof, there is shown a part of a reactor pressure vessel 1 with upper connecting branches 2 for a primary circulation and a dome 3. Above the upper connecting branches 2, a cross section of the reactor pressure vessel 1 is covered by an upper support plate 4. The support plate 4 has openings 5 for control rods 6.

In the reactor pressure vessel 1 with a "hot dome", an opening 5 is larger than a cross section of a control rod 6. The support plate 4 then takes a form of a lattice plate, for example. In the reactor pressure vessel 1 of the "cold dome" type the opening 5 is largely identical in size to the cross section of the control rod 6.

In order that the medium (coolant) present in the reactor pressure vessel 1 can be exchanged between a lower chamber 1a below the support plate 4 and an upper dome chamber 1b above the support plate 4, an equalization opening (dome bypass) 7 is provided in the support plate 4 in both variants. The equalization opening 7 is smaller in the "hot dome" than in the "cold dome".

In the "cold dome" a bypass of coolant through the equalization opening 7 is necessary only in order that the boron concentration may be equalized on both sides of the support plate 4. Otherwise it is desirable in power output operation that as little coolant as possible should pass into the dome chamber 1b, so that the power output of the power station can be maximized. When running the nuclear power station down, however, the rate of cooling in the dome chamber 1b should not be slower than in the lower chamber 1a. A larger temperature difference between the upper and the lower side of the support plate 4 would namely retard the cooling process unnecessarily and lead to problems when opening dome bolts 16, represented in diagrammatic form. Consequently a great exchange of coolant between the lower chamber 1a and the dome chamber 1b is advisable when shutting down.

Figure 2:
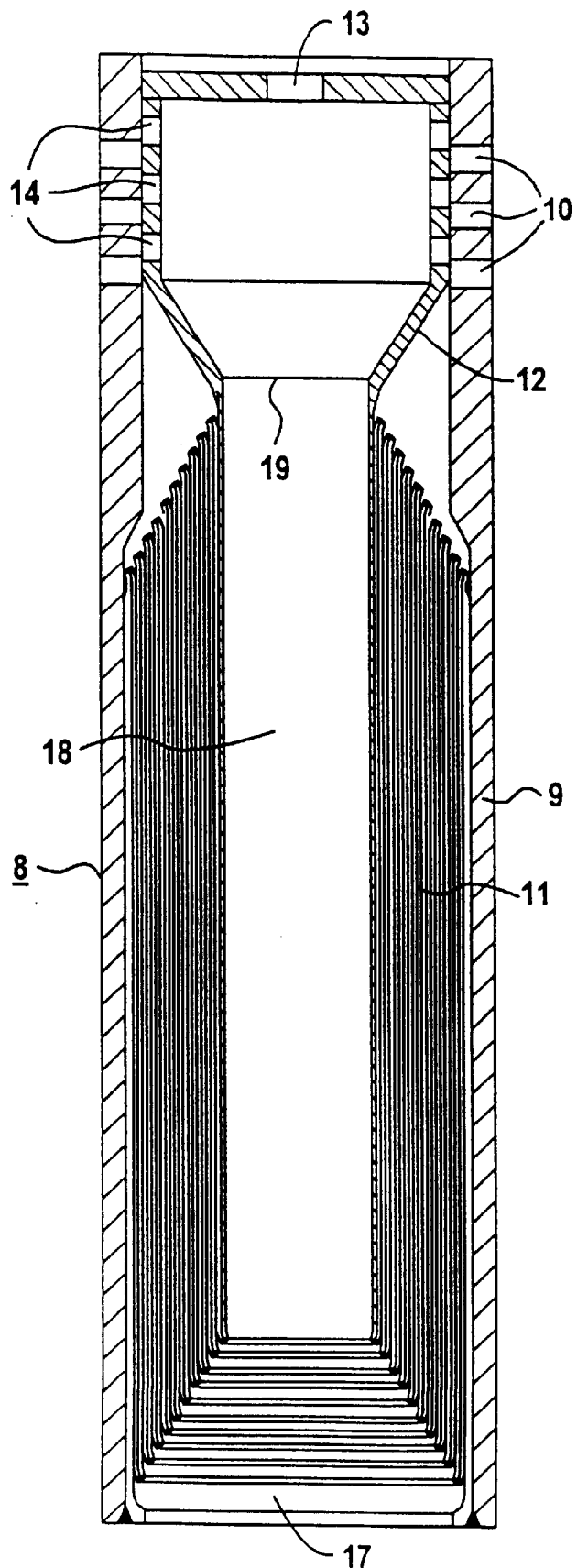
FIG. 2 is a sectional view of a device, which is to be disposed in the equalization opening and ensures a cross section of the opening that can be varied as a function of temperature.

In order that the equalization opening 7 is relatively large when running the nuclear power station down and relatively small in power output operation, a device 8 shown in FIG. 2 is to be fitted into the equalization opening 7 (dome bypass). The device 8 varies the opening cross section and hence the medium flow in the bypass as a function of the temperature. In the event of a temperature drop in the lower chamber 1a to a temperature lower than that in the upper dome chamber 1b, which occurs when running a nuclear power station down, the opening cross section of the equalization opening 7 is enlarged, so that temperature equalization with the still hotter dome chamber 1b is ensured. While the temperature in the lower chamber 1a in power output operation is higher than the temperature in the upper dome chamber 1b, however, the cross section of the equalization opening 7 remains relatively small, sufficient only to ensure the exchange of boronized water between the two chambers 1a and 1b. A power loss as the result of an unnecessarily large dome bypass or an unnecessarily large equalization opening 7 is avoided.

The device 8 is shown in detail in FIG. 2. It has a cylinder 9, which is open at both ends. In an upper area, openings 10 are disposed in a side wall of the cylinder 9. In the lower area of the cylinder 9 there is an expansion sleeve 11 known in the art, for example described in Published, Non-Prosecuted German Patent Application DE 196 07 693 A1, which in the event of a temperature rise expands in an axial direction of the cylinder 9. The expansion sleeve 11 is connected to a hollow piston 12. Inside the expansion sleeve 11 there is a duct 18 connected to a lower opening 17 of the device 8, which duct at a lower end opening 19 of the piston 12 opens into the interior of the piston 12. The piston 12, at its upper end, has an upper opening 13, which represents a minimum opening cross section of the device 8. The piston 12 also has additional lateral openings 14, which align with or overlap the openings 10 in the cylinder wall only when the expansion sleeve 11 is contracted.

A temperature drop in the lower chamber 1a, which occurs when running the nuclear power station down, leads to a contraction of the expansion sleeve 11, which brings the lateral openings 14 of the piston 12 into contact with the openings 10 in the cylinder wall of the cylinder 9, thereby significantly enlarging the opening cross section of the device 8.

The device 8 shown therefore ensures a process for temperature equalization between the chambers 1a and 1b, which varies the flow of medium or coolant through the equalization opening 7 (dome bypass) as a function of the temperature. This affords the advantage that when running the nuclear power station down a large flow of medium is ensured from the lower chamber 1a into the dome chamber 1b for the rapid cooling of the dome 3, while in power output operation only a then sufficiently small flow occurs, so that power losses are avoided.

We claim:

1. A reactor pressure vessel, comprising:
   a reactor pressure body having a chamber formed therein and a cross-section;
   upper connecting branches connected to said reactor pressure body;
   an upper support plate disposed in said reactor pressure body above said upper connecting branches and expanding over said cross-section of said reactor pressure body, said upper support plate dividing said chamber of said reactor pressure body into an upper dome chamber and a lower chamber, said upper support plate having openings formed therein for accommodating control rods and at least one equalization opening formed therein, said equalization opening having a cross section; and a device fitted in said equalization opening for varying said cross section as an inverse function of a temperature in said lower chamber.

2. The reactor pressure vessel according to claim 1, including core installations disposed in said reactor pressure body, said reactor pressure body having a pressure vessel wall, a space between said pressure vessel wall and said core installations defines an equalization chamber leading to said equalization opening formed in said support plate body, said equalization opening and said equalization chamber forms a bypass between said lower chamber and said upper dome chamber.

3. The reactor pressure vessel according to claim 1, wherein said cross section of said equalization opening is passively temperature-controlled.

4. The reactor pressure vessel according to claim 1, wherein: said device in an event of a temperature drop enlarges said cross section of said equalization opening by utilizing a thermal contraction of a material of said device, and in an event of a temperature rise said device reduces said cross section of said equalization opening by utilizing a thermal expansion of said material of said device.

5. The reactor pressure vessel according to claim 4, wherein said device has an expansion sleeve.

6. The reactor pressure vessel according to claim 5, wherein said device has a cylinder and a hollow piston guided in said cylinder, said device further having an expansion sleeve connected to said hollow piston, said hollow piston having end openings and an interior formed therein and said cylinder having cooling openings formed therein, said interior of said hollow piston connected by way of said end openings of said hollow piston to both said lower chamber below said support plate and to said upper dome chamber disposed above said support plate, and said hollow piston has additional lateral openings formed therein which when said expansion sleeve contracts aligns with said cooling openings of said cylinder.

7. A process for temperature equalization between an upper dome chamber disposed above a lower chamber in a reactor pressure vessel, a support plate occupying a cross section of the reactor pressure vessel above upper connecting branches of the reactor pressure vessel and the supporting plate separating the upper dome chamber from the lower chamber, which comprises the steps of:

supplying a flow of a medium between the upper dome chamber and the lower chamber through an equalization opening in the support plate; and using a device fitted in the equalization opening for varying the flow of the medium as an inverse function of a temperature in the lower chamber by varying a cross section of the equalization opening.

8. The process according to claim 7, which comprises supplying a bypass flow of the medium from the lower chamber, which is a reactor annulus defined by a pressure vessel wall and core installations, into the upper dome chamber through the equalization opening.

9. The process according to claim 7, which comprises using a passively temperature-control method for controlling the flow of the medium.

10. The process according to claim 7, wherein the flow of the medium is increased owing to a temperature drop when shutting down the reactor pressure vessel.

* * * * *